United States Patent [19]
Bauer et al.

[11] Patent Number: 6,073,057
[45] Date of Patent: Jun. 6, 2000

[54] COMPUTER-CONTROLLABLE BENDING MACHINE

[75] Inventors: Franz Bauer; Alois Schechtl, both of Edling, Germany

[73] Assignee: Schechtl Maschinenbau GmbH, Edling, Germany

[21] Appl. No.: 08/951,093

[22] Filed: Oct. 15, 1997

[30] Foreign Application Priority Data

Oct. 18, 1996 [DE] Germany .......................... 196 43 146

[51] Int. Cl.[7] .............................. G06F 19/00; G06G 7/66
[52] U.S. Cl. ................................ 700/165; 700/206; 72/37
[58] Field of Search ........................ 364/474.07, 476.01; 72/37; 700/165, 206

[56] References Cited

U.S. PATENT DOCUMENTS

| | | | |
|---|---|---|---|
| 4,864,509 | 9/1989 | Somerville et al. | 364/476 |
| 5,315,522 | 5/1994 | Kauffman et al. | 364/474.07 |
| 5,479,343 | 12/1995 | Matoba et al. | 364/401 |
| 5,519,623 | 5/1996 | Pourboghrat | 364/474.07 |
| 5,531,087 | 7/1996 | Kitabayashi et al. | 72/37 |
| 5,828,575 | 10/1998 | Sakai | 364/474.24 |

FOREIGN PATENT DOCUMENTS

| | | |
|---|---|---|
| 178328A1 | 4/1986 | European Pat. Off. . |
| 9313816 | 3/1994 | Germany . |
| 2223606A | 4/1990 | United Kingdom . |

OTHER PUBLICATIONS

Staude, R., "Auf den Einsatzfall zugeschnitten" in Industrie–Anzeiger 28/1990, S.28–30.

Ising, Gerd, "Entwickein von Expertensystemen fur Schwenkbiegemaschinen" in Bander, Bleche, Rohre, 7–1990, S.29–32.

Produktion Hochflexibel Blechbearbeitung in Industrie Anzeiger, 20/93, S.21–23.

Reetz, Volker, "CNC–Steuerungen fur die Blechbearbeitung" in Energie & Automation, 11, 1989 Special "EMO 1989", S.15–18.

Hull, Stefan; Sauer, Wolfgang; "Numerisch gesteuerte Blechbearbeitung" in Werkstatt und Betrieb 120, 1987, 8, S.639–641.

Von Ing. (grad.) W.v. Zeppelin, Reichenbach/Fils, "Parallel-programmieren und grafische Simulation erschließen weitere Moglichkeiten der Werkstattprogrammierung" Hermann Traub Maschinenfabrik, D–7313–Reichenbach/Fils, Postfach 1180.

Bromer, Gunter & Reetz, Volker; "Programmieren von Stanz–und Nibbelmaschinen leichtgemacht" in Energie & Automation 9 (1987) Special "EMO 1987" pp 32–34.

Raether, Von Christian, "Grafisch–interatktives Programmiersystem fur CNC–Maschinen" in Technische Rundschau 35/88.

Riehn, Asko, "Intelligent Bediefunktionen" in Fertigungstechnik 1 m + w 3/1988.

*Primary Examiner*—William Grant
*Assistant Examiner*—Victoria Robinson
*Attorney, Agent, or Firm*—Weingarten, Schurggin Gagnebin & Hayes LLP

[57] ABSTRACT

A computer-controllable bending machine is connected to a computer via its conventional control unit. The computer is equipped with an input keyboard adapted to the properties of a bending machine and a screen display for displaying a graphical surface which is capable of displaying the bending operation true to scale both in a programming mode and in an operating mode.

7 Claims, 9 Drawing Sheets

FIG. 4

| No. | Bit gauge | Rotation | Bending angle | Correction angle +/- | Upper cheek | Close enclosure | Repetition |
|---|---|---|---|---|---|---|---|
| 1 | X: 260.0 | R: 0 | B: 55.0 | K: 0.0 | Z: 0.0 | U: 0.0 | N: 0 |
| 2 | X: 200.0 | R: W | B: 90.0 | K: 0.0 | Z: 0.0 | U: 0.0 | N: 0 |
| 3 | X: 180.0 | R: 0 | B: 45.0 | K: 0.0 | Z: 0.0 | U: 0.0 | N: 0 |
| 4 | X: 0.0 | R: D | B: 0.0 | K: 0.0 | Z: 0.0 | U: 0.0 | N: 0 |
| 5 | X: 150.0 | R: 0 | B: 90.0 | K: 0.0 | Z: 0.0 | U: 0.0 | N: 0 |
| 6 | X: 0.0 | R: D | B: 0.0 | K: 0.0 | Z: 0.0 | U: 0.0 | N: 0 |
| 7 | X: 70.0 | R: 0 | B: 10.0 | K: 0.0 | Z: 0.0 | U: 0.0 | N: 0 |
| 8 | X: 0.0 | R: 0 | B: 0.0 | K: 0.0 | Z: 0.0 | U: 0.0 | N: 0 |
| 9 | X: 0.0 | R: 0 | B: 0.0 | K: 0.0 | Z: 0.0 | U: 0.0 | N: 0 |
| 10 | X: 0.0 | R: 0 | B: 0.0 | K: 0.0 | Z: 0.0 | U: 0.0 | N: 0 |
| 11 | X: 0.0 | R: 0 | B: 0.0 | K: 0.0 | Z: 0.0 | U: 0.0 | N: 0 |
| 12 | X: 0.0 | R: 0 | B: 0.0 | K: 0.0 | Z: 0.0 | U: 0.0 | N: 0 |
| 13 | X: 0.0 | R: 0 | B: 0.0 | K: 0.0 | Z: 0.0 | U: 0.0 | N: 0 |
| 14 | X: 0.0 | R: 0 | B: 0.0 | K: 0.0 | Z: 0.0 | U: 0.0 | N: 0 |
| 15 | X: 0.0 | R: 0 | B: 0.0 | K: 0.0 | Z: 0.0 | U: 0.0 | N: 0 |
| 16 | X: 0.0 | R: 0 | B: 0.0 | K: 0.0 | Z: 0.0 | U: 0.0 | N: 0 |
| 17 | X: 0.0 | R: 0 | B: 0.0 | K: 0.0 | Z: 0.0 | U: 0.0 | N: 0 |
| 18 | X: 0.0 | R: 0 | B: 0.0 | K: 0.0 | Z: 0.0 | U: 0.0 | N: 0 |
| 19 | X: 0.0 | R: 0 | B: 0.0 | K: 0.0 | Z: 0.0 | U: 0.0 | N: 0 |
| 20 | X: 0.0 | R: 0 | B: 0.0 | K: 0.0 | Z: 0.0 | U: 0.0 | N: 0 |
| 1 | X: 260.0 | R: 0 | B: 55.0 | K: 0.0 | Z: 0.0 | U: 0.0 | N: 0 |

X — 260.0
B — 550.0
Z — 0.0

Number: 033
Name: PROFILE THB-1
Cut: 300.0
Total correction angle: 1.2

Vo.3a
F1= Graphical displ.
F2= Functions
S= Cut
K= Total corr. ang.
R= Reference run

| X: | B: | Z: |
|---|---|---|
| 0.0 | 0.0 | 0.0 |

| | | | | | | |
|---|---|---|---|---|---|---|
| X | Bit gauge 0.0 mm (return) | B | Bending angle 160.0 ° (limit) | Z | Upper cheek stop 150.0 mm (preliminary switch-off) | |
| X | Bit gauge 1000.0 mm (max. length) | B | Bending cheek 4.0 ° (ref. point) | Z | Upper cheek 0.2 mm (reference point) | |
| X | Bit gauge 995.0 mm (reference pt.) | B | Bending cheek 15.0 ° (creep path, top) | Z | Upper cheek 0.0 mm (creep path) | |
| X | Bit gauge 22.5 mm (creep path) | B | Bending cheek 0.8 ° (brake path, top) | Z | Upper cheek 7.0 mm (braking increments) | |
| X | Bit gauge 0.3 mm (brake path) | B | Bending cheek 15.0 ° (creep path, bott.) | Z | Upper cheek up 20.0 mm (with bit gauge forward) (automatic operation) | |
| X | Bit gauge 0.4 V (min. speed) | B | Bending cheek 0.8 ° (brake path, bott.) | Z | Upper cheek up 15.0 mm (with bit gauge forward) (manual operation) | |
| V | Bit gauge 9.9 V (max. speed) | T | Bending cheek 0.3 s (switch-over timet) | N | Machine selection 1.0 0=MA, 1=MAB, 2=MAC | |
| V | Bending cheek 2.6 V (min. speed) | T | Upper cheek 0.3 s (switch-over timet) | N | EMERGENCY-OFF automatic function (auto. open of upper cheek) 0.0 0=no, 1=yes | |
| V | Bending cheek 2.6 V (max. speed) | T | Bit gauge 0.3 s (switch-over time) | N | Embossing admissible 0.0 0=no, 1=yes | |
| V | Upper cheek 0.0 V (min. speed) | T | 0.0 | N | Upper cheek open with bending cheek und. 90 ° 0.0 0=no, 1=yes | |
| V | Upper cheek 0.0 V (max. speed) | | 0.0 | N | Language selection 0.0 0=German, 1=English | |
| | | X | Bit gauge 1 mm (return) | | | |

PE — Press "PE" to return

FIG. 5

COMPUTER-CONTROLLABLE BENDING MACHINE

TECHNICAL FIELD OF THE INVENTION

The present invention relates to a computer-controllable bending machine for bending metal sheets.

BACKGROUND ART

A bending machine with a computer mounted on said machine and having a keyboard and a display is known. The display consists of an LCD screen on which bending profiles prestored in a memory may be displayed schematically. The numbers of relevance for the individual bending parameters may be inputted via the keyboard, but will not influence the image displayed on the LCD screen. Merely the numbers will be displayed, with the image remaining unchanged. As a consequence, the image does not render the proportions of the bending profile as actually set.

SUMMARY OF THE INVENTION

It is the object of the invention to provide a computer-controllable bending machine which allows flexible control of the most varied bending profiles which do not have to be prestored in the machine.

This object is accomplished by the features of the characterizing part of the independent main claim.

The subclaims indicate preferred embodiments of the basic inventive concept.

The invention makes it possible to program the machine in an "input model" thereof, with the result of the individual programming steps being displayed on a graphical surface. Bending operations which are impossible and have been inputted by accident only may thus be readily recognized and corrected by means of the true-to-scale on-screen display which is up-dated after each programmed bending operation (in such input mode).

BRIEF DESCRIPTION OF THE DRAWINGS

These and other objects, features and advantages of the present invention will become more apparent from the following description of the preferred embodiments taken in conjunction with the accompanying drawings, in which:

FIGS. 3 to 5 are different graphical displays of the programming mode, as they appear on a screen;

DESCRIPTION OF THE PREFERRED EMBODIMENTS

Figure 1:
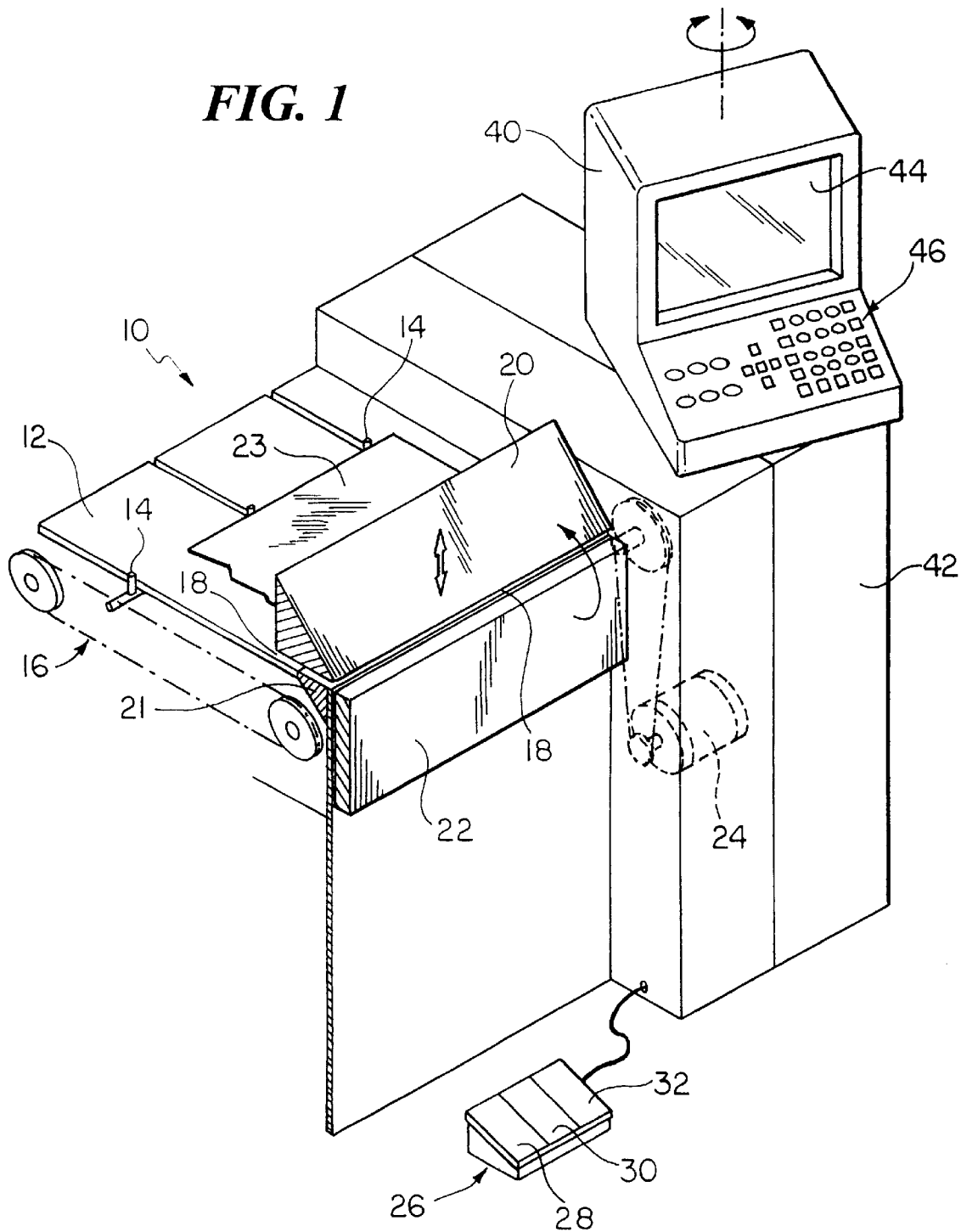
FIG. 1 is a schematical perspective view of a novel bending machine.

Now referring to FIG. 1, a bending machine 10 is shown therein merely schematically and roughly in perspective—for ease of understanding—in order to be able to explain the invention in detail. A metal sheet 23 of a random material such as iron, zinc, aluminum, copper or alloys thereof, which are capable of being deformed in a mechanical or industrial folding or bending process, is placed on a table 12 such that its rear edge is in front of advancing elements 14. These advancing elements 14, which are connected to drive means 16, are capable of very accurately displacing said metal sheet by a set measure, the socalled bit stop or bit gauge X (FIGS. 3–7), in the direction of a gap 18 so as to cause the strip of said metal sheet 23 to be folded or bent to pass through and project from said gap 18. A drive (not shown) causes a clamping cheek or upper cheek 20 to be raised or lowered. This clamping cheek 20 serves to press the metal sheet against an abutment 21, and a bending cheek 22, driven by a motor 24, can be made to pivot about the desired or selected bending angle B so as to fold or bend the strip of said metal sheet 23 relative to the remaining sheet.

In a system which is not computer-assisted, the machine is operated via a foot-actuated switch 26 having three keys 28, 30 and 32.

If key 28 is semi-depressed for example, the clamping cheek 20 is made to move downward, thus gradually closing said gap 18. If said key 28 is fully depressed, this closing movement may be halted at any position. Similarly, by actuating key 30, the operator may pivot and halt the bending cheek 22, whereas key 32 is operated to open said clamping cheek 20 for example.

Figure 2:
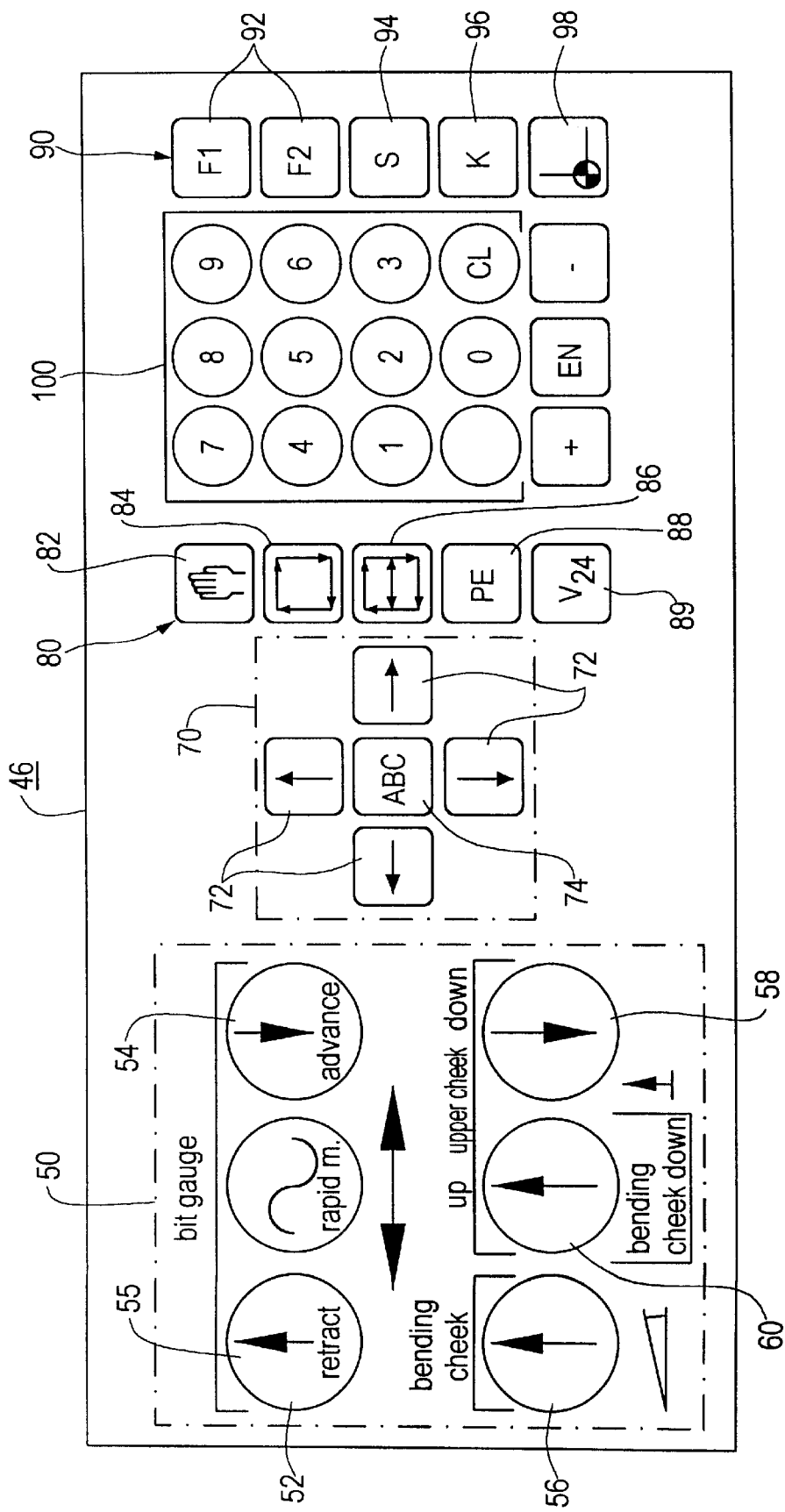
FIG. 2 is a top view of a keyboard designed according to the invention.

According to the invention, the machine 10 is connected to a computer 40 via a switchbox 42. The computer 40 has a screen 44 which displays a graphical surface. The computer 40 is operated via an operation panel 46 which is described in more detail with reference to FIG. 2.

The keyboard 46 is made up of several blocks. Block 50 contains manual keys by means of which said machine 10 can be operated by hand. Block 70 contains cursor keys. Rows of keys 80 and 90 include function keys and block 100 is the conventional numerical block.

In block 50, keys 52 and 54 serve to manually control the bit gauge X by movement of said advancing elements 14, and when key 55 is additionally depressed, the advancing elements 14 are advanced or retracted in rapid motion. Key 56 serves to manually initiate an upward movement of the bending cheek 22 under an angle B whereas the operation of key 60 simultaneously causes a downward movement of said bending cheek 22 as well as an upward movement of said upper cheek 20. This double function is explained by the fact that once the bending operation is completed, the clamping by the upper cheek 20 of the metal sheet to be bent needs to be released to allow a change of position of the metal sheet to be bent. Depressing key 58 causes said upper cheek 20 to move downward. Depending on the settings, these keys can cause or halt the corresponding movements for as long as there is pressure on the respective key. Block 70 contains cursor keys 72 as well as a key 74 marked ABC which, when depressed, causes an alphanumeric block to be displayed on the screen 44 from which desired letters and digits may be selected via cursor keys 72 for entering for instance a program name or a program number on the screen surface.

Key row 80 includes a key 82 for switching to manual operation, a key 84 for switching to automatic operation without bit gauge, a key 86 for switching to automatic operation with bit gauge, a program input key 88 as well as a key 89 for writing or reading data via an interface, for example a V24 interface.

Block 100 contains a numerical block via which corresponding numerical values may be input to the program. The function keys 92 can be used for switching between various program and display modes. After the desired bending operations have been input, operation of key 94 causes the required dimensions of the cut to be calculated. Key 96 is used for correcting input data, whereas key 98 is provided for calibrating the individual parameters, in particular the bit gauge.

Steps to be performed manually such as "turning over", "turning round" or "rotating" may be input via the ABC key in combination with the cursor keys 72.

Depending on what has been selected via one or several function keys in row 90, the graphical surface on screen 44 may show various different displays which are illustrated in FIGS. 3 to 7.

Figure 3:
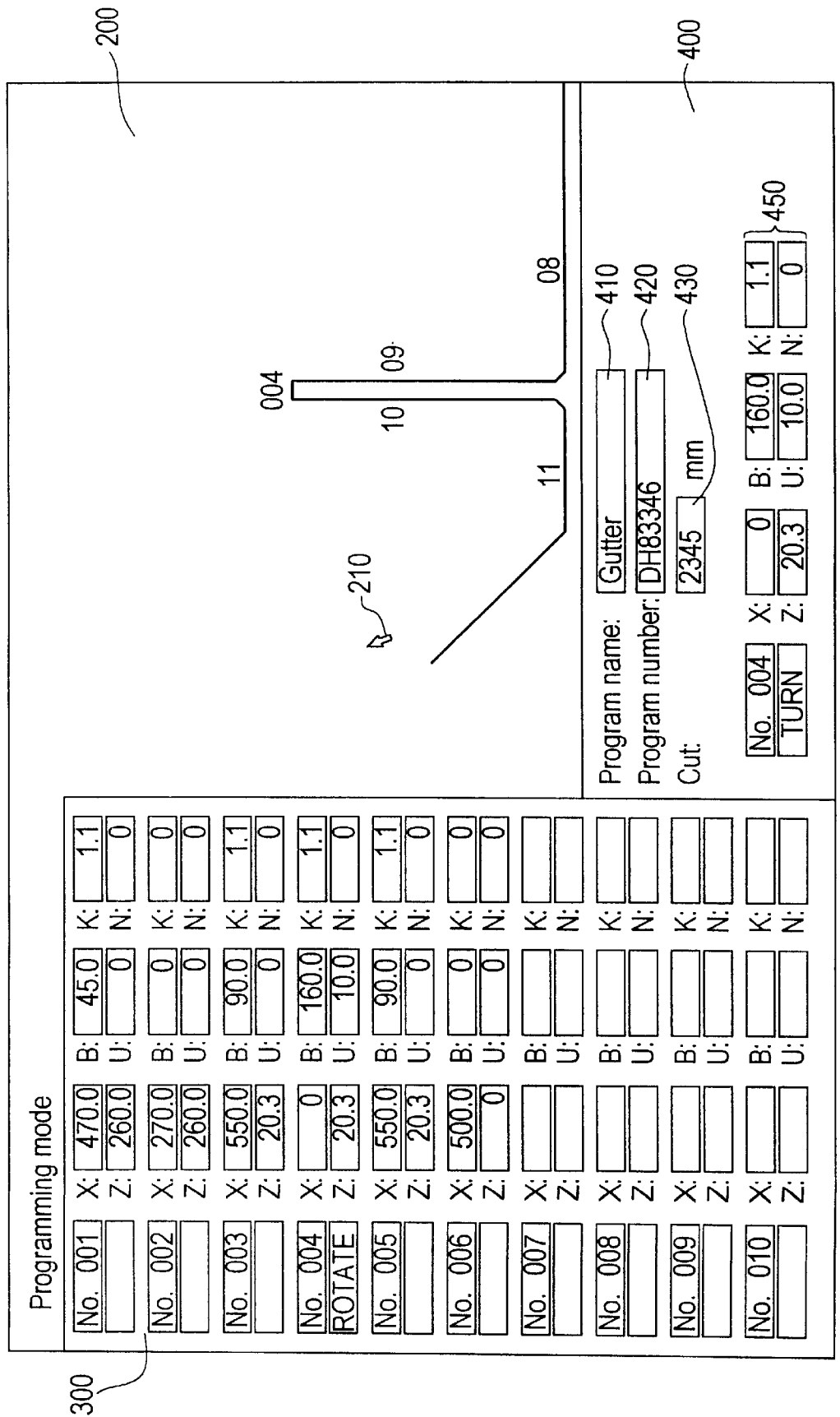

FIGS. 3 to 5 show graphical surfaces of the programming mode as they appear on screen 44.

As shown in FIG. 3, the screen 44 furthermore displays a cursor 210 movable via cursor keys 72 in a graphical window 200, a window 300 with programming stages nos. 001 to 010 and an information window 400.

Field 410 of said information window 400 indicates a program name and field 420 thereof indicates a program number. In a further field 430 the dimensions of the cut determined by the computer 40, i.e. the depth of the metal sheet to be bent, is indicated in "mm". Fields 450 correspond to the fields in window 300 and display the step being programmed, i.e. step no. 004 in the present example.

The fields of window 300 are

No.=a numerical field.

X=a field for the supply step in "mm" by which the metal sheet is advanced by said advancing elements 14, also called "bit gauge" (cf. FIG. 4).

B=the angle by which the metal sheet is folded or bent (in angular degrees).

K=a correction angle, i.e. a superangle (measured in angular degrees) by which the bending cheek bends or folds the metal sheet further than the desired degree due to certain material properties such as a rebound elasticity. According to the invention, this material property may be stored in advance in the computer memory for a certain material so that this field calculates itself as it were. Even if the value of this field is calculated in this manner, it may be corrected or directly entered via input field 46 based on empirical data.

Z=the opening width of gap 18 by which gap 18 is reopened after completion of the current program step so as to enable the sheet to be bent to be passed therethrough. For short processing times, this value should be kept as closely as possible to the minimum required value.

U=a field containing a measure to which a folded metal sheet is to be compressed between clamping cheek 20 and its abutment after it has been inserted. This serves to accomplish bending angles in a range of between 160°–180° which would otherwise be hard to achieve in a bending process which uses the bending cheek, due to the finite expansion of the upper cheek.

K=the number of repetitions of the respective program step which clearly simplifies the awkward task of repeatedly inputting identical bending operations as they occur for example in the programming for producing curved portions.

Window 200 shows a view of the profile of the metal sheet in correct graphical proportions so that the operator can get an idea of the bending operation already during programming and before the operation is actually started. The program step numbers also appear in this graphical window 200.

With reference to FIG. 4, the graphical display has been omitted therefrom and only window 300 is shown therein, but in an enlarged and clearer form. The program line which is being processed (no. 1) is highlighted and repeated at the bottom. In an additional window 500 the significant three parameters X, B and Z are displayed in large letters.

In a different functional setting of input field 46, additional text information appears in window 500 above a program field 300 as shown in FIG. 5, which text information further facilitates the operator's task.

Figure 6:
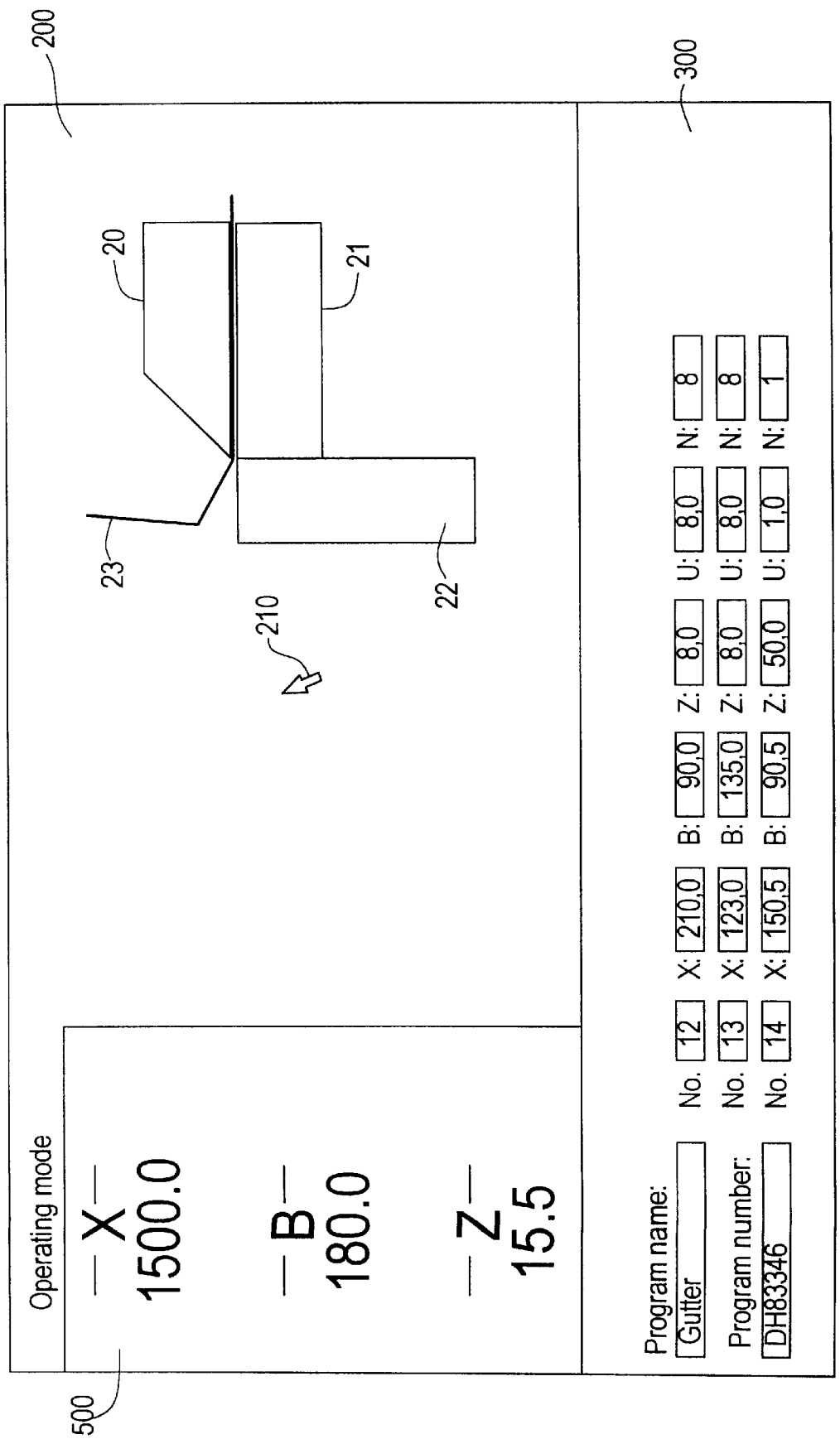
FIGS. 6 and 7 are different graphical displays of the operating mode, as they appear on a screen.
Figure 7:
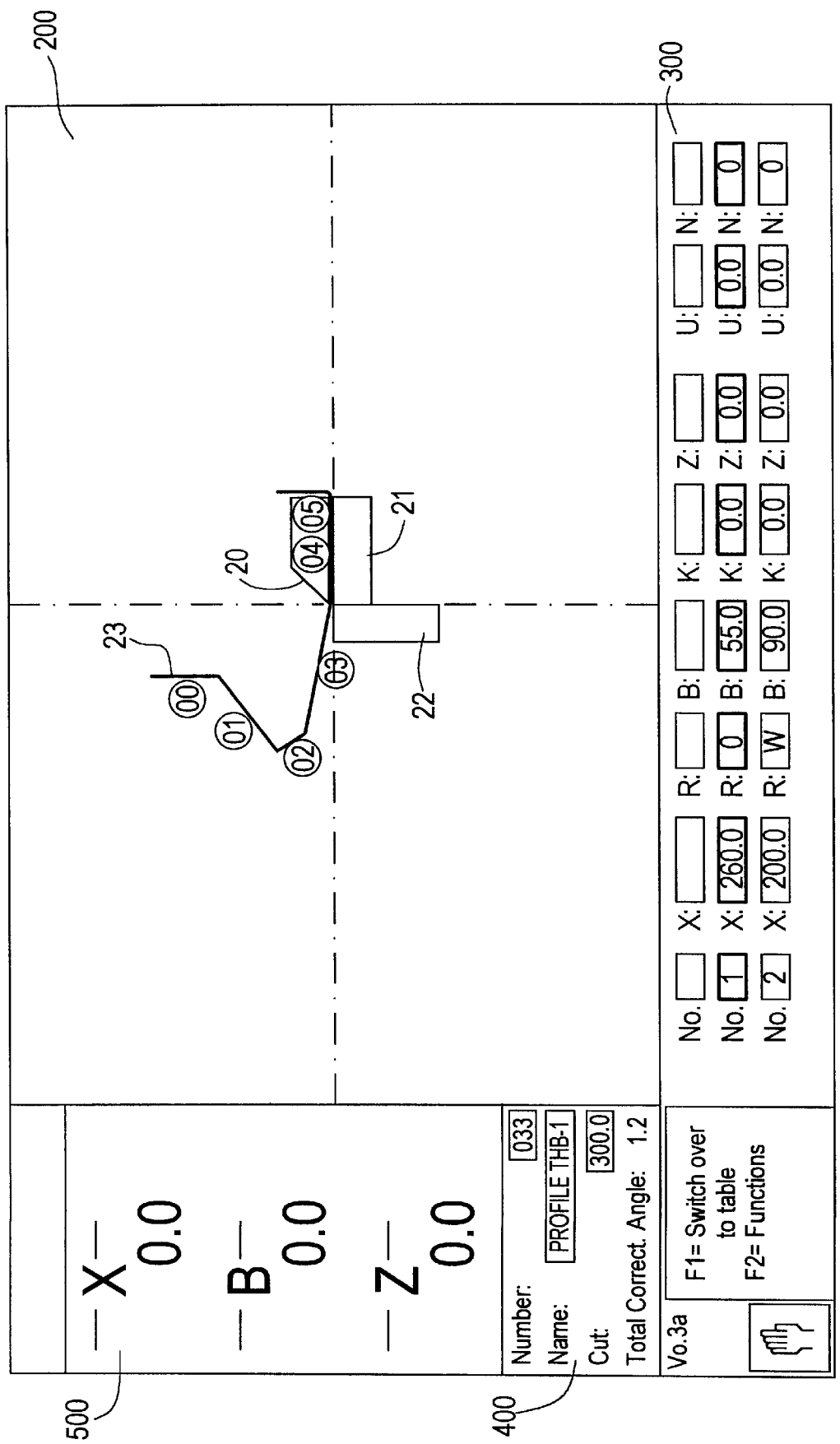

FIGS. 6 and 7 show two operating modes which clearly illustrate that the tools of the machine, i.e. the movable clamping cheek or upper cheek 20, the associated stationary abutment 21 and the bending cheek 22, are also capable of being displayed in the graphical window 200.

In practice, the graphical display on screen 44 is in colour, with tools 20 to 22 being contrasted in colour with a displayed image 23 of the metal sheet.

Figure 8:
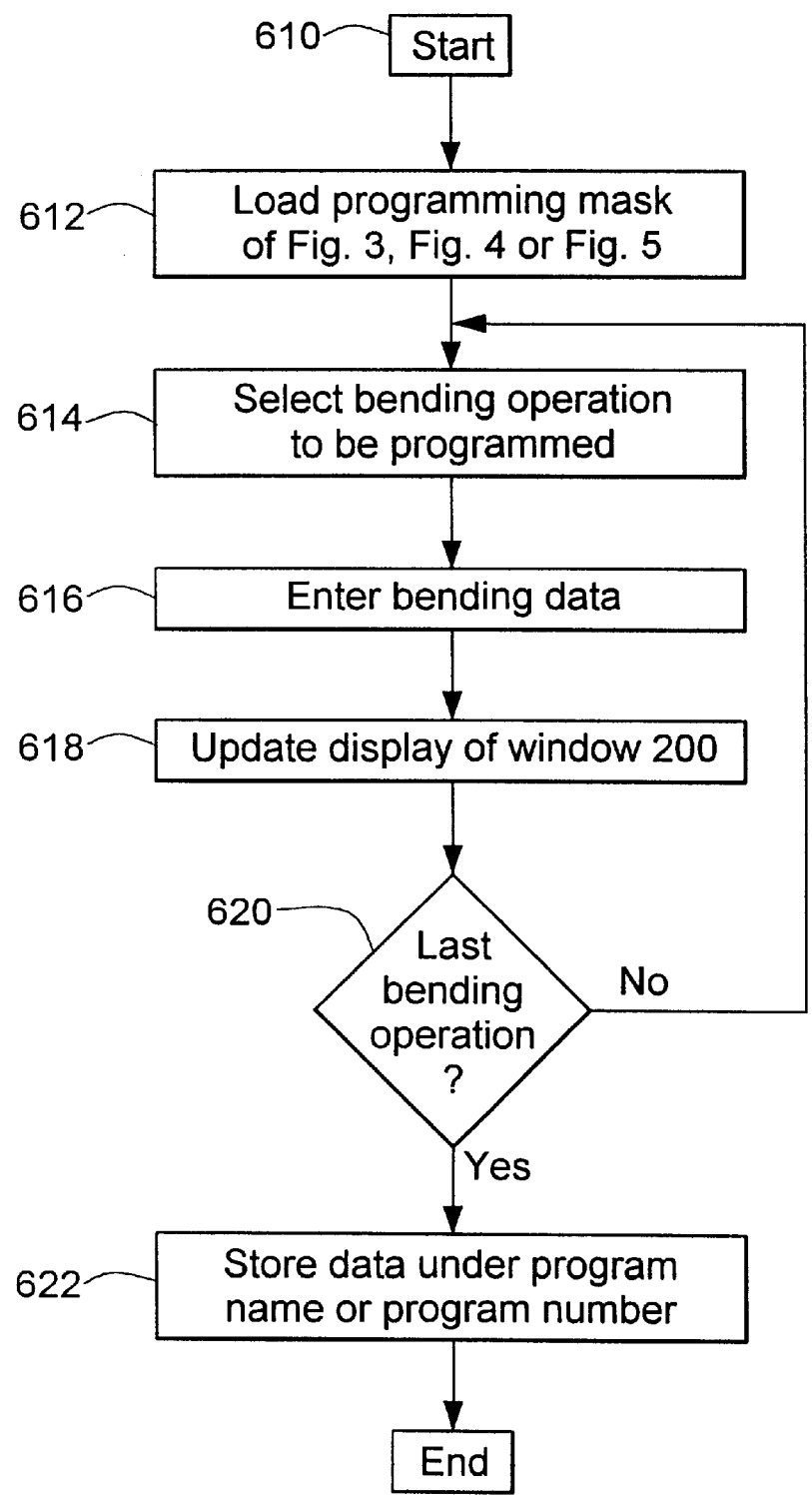
FIG. 8 is a program flow chart illustrating the steps of programming a series of bending operations.

FIG. 8 illustrates a program flowchart for programming one or a plurality of bending operation(s). After the start in step 610 the programming mask either of FIG. 3, FIG. 4 or FIG. 5 is retrieved from the memory in step 612 for display on screen 44. In step 614 the operator selects the number of the bending operation to be programmed and in step 616 he inputs the desired data. In step 618 the display in window 200 is updated true to scale. Steps 614, 616 and 618 are repeated until the last bending operation is input in step 620. In step 622 the input data is subsequently stored under a program name or a program number, thus terminating the programming mode.

Figure 9:
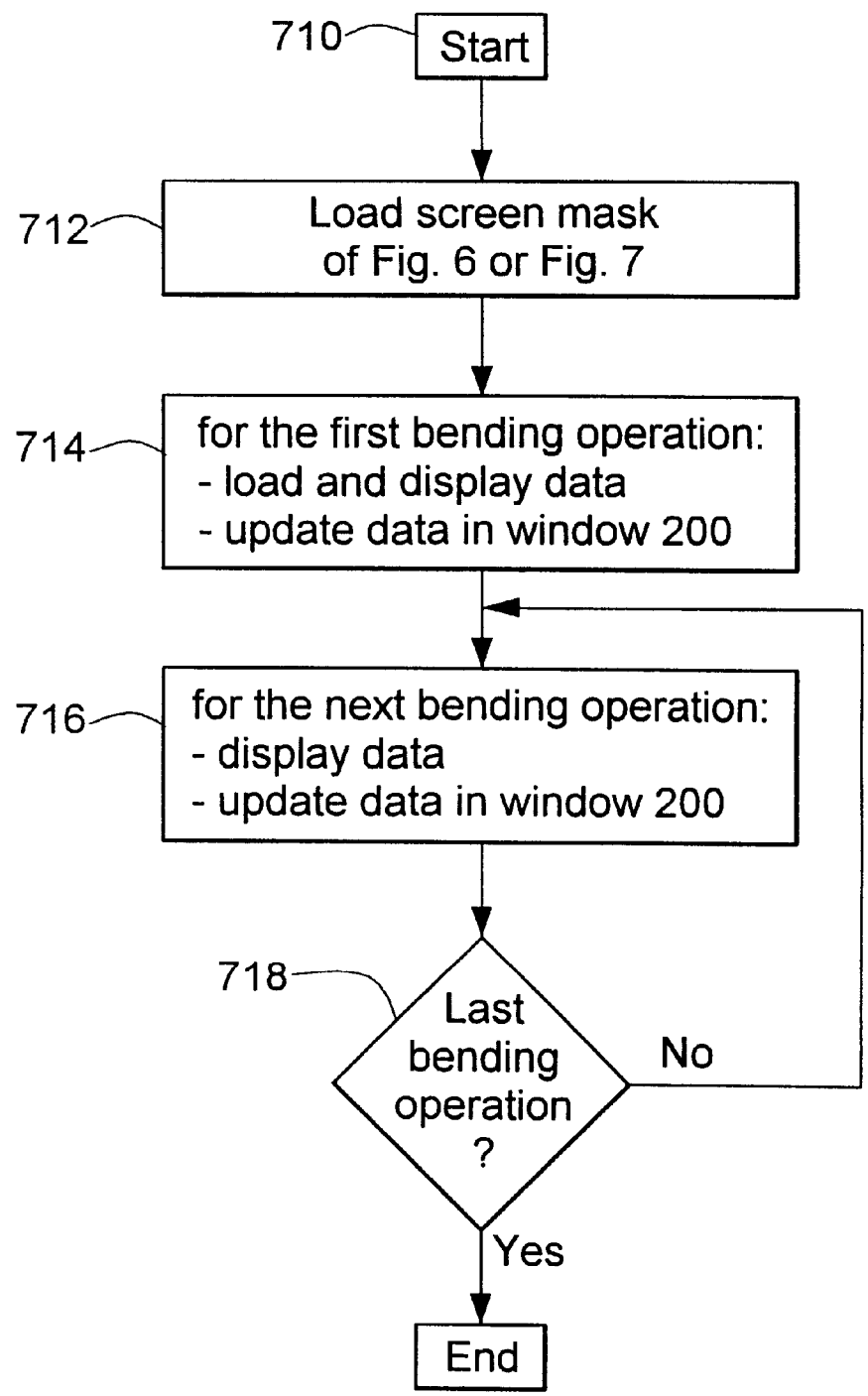
FIG. 9 is a program flow chart illustrating the steps of executing a programmed series of bending operations.

FIG. 9 is an illustration of a program flow of the execution of a preprogrammed series of bending operations. After the start in step 710, a screen mask according to FIG. 6 or FIG. 7 is read out from the memory in step 712. Subsequently, the already input and stored data for the first bending operation is displayed in step 714 and the display of window 200 is updated true to scale in accordance with the data of the first bending operation. In particular, it is also displayed if and how the workpiece needs to be turned over or around or rotated for the next bending operation. In step 716 the data for the next bending operation is subsequently displayed and the display of window 200 is updated again. This step is repeated until the last bending operation is detected in step 718 after which the program is terminated.

Although the invention has been described in its preferred embodiments, it is to be understood that various changes and modifications may be made within the purview of the appended claims without departing from the true scope and spirit of the invention in its broader aspects.

What is claimed is:

1. A computer-controllable bending machine for bending metal sheets, with a computer having a display and an input keyboard, which computer is connected to said machine via a control unit, wherein said computer is capable of being switched from a programming mode to an operating mode, whereby in said programming mode, at least the parameters for a bit gauge (X), a bending angle (B) and a movement (X) of a clamping cheek may be set numerically and displayed proportionally to the input parameters on a screen as a true-to-scale schematical representation of the bending profile, whereas in the operating mode, the respective position of the machine may be schematically displayed on the screen in addition to the bending profile and in timed correlation to the operating status of the machine.

2. The bending machine according to claim 1, wherein in the programming mode, a pause for manipulations such as turning the metal sheet over or around by hand or for subsequently closing (U) an open bending profile by lowering the clamping cheek may be set in addition to the setting of the bit gauge (X) and the bending angle (B).

3. The bending machine according to claim 1, wherein in the programming mode, a correction angle (K) may be inputted in addition to each setting of the bending angle (B), said correction angle taking into consideration material properties such as an elastic rebound.

4. The bending machine according to claim 1, wherein in the programming mode, an opening of the gap below the clamping cheek may be set by the computer as a computer-calculated value or entered via the keyboard in accordance with the required passing height of the previously produced bending profile.

5. The bending machine according to claim 1, wherein in the programming mode, each step may be set for any desired number of repetitions (W).

6. The bending machine according to claim 1, wherein the computer calculates the dimensions of the cut of the metal sheet.

7. The bending machine according to claim 1, wherein the screen is a colour screen.

* * * * *